United States Patent
Bigbee-Hansen et al.

(10) Patent No.: US 10,746,090 B2
(45) Date of Patent: Aug. 18, 2020

(54) HIGH ALTITUDE INTERNAL COMBUSTION ENGINE/TURBOCHARGER EXHAUST COMBUSTOR

(71) Applicant: The Boeing Company, Chicago, IL (US)

(72) Inventors: William John Bigbee-Hansen, Renton, WA (US); Timothy A. Johnson, Issaquah, WA (US)

(73) Assignee: THE BOEING COMPANY, Chicago, IL (US)

(*) Notice: Subject to any disclaimer, the term of this patent is extended or adjusted under 35 U.S.C. 154(b) by 0 days.

(21) Appl. No.: 16/114,046

(22) Filed: Aug. 27, 2018

(65) Prior Publication Data

US 2020/0063647 A1     Feb. 27, 2020

(51) Int. Cl.
*F02C 7/266* (2006.01)
*F02B 37/11* (2006.01)
*F02M 57/04* (2006.01)
*F02K 3/06* (2006.01)

(52) U.S. Cl.
CPC .......... *F02B 37/11* (2013.01); *F02M 57/04* (2013.01); *B60Y 2400/435* (2013.01); *F02C 7/266* (2013.01); *F02K 3/06* (2013.01); *F02M 2700/31* (2013.01)

(58) Field of Classification Search
CPC ...... F02M 57/04; F02M 2700/31; F02B 37/11
USPC ................ 123/550; 60/613, 286, 303, 304
See application file for complete search history.

(56) References Cited

U.S. PATENT DOCUMENTS

| | | | |
|---|---|---|---|
| 2,580,591 A | 1/1952 | Jean | |
| 4,449,370 A | 5/1984 | Ream | |
| 5,845,483 A | 12/1998 | Petrowicz | |
| 8,141,360 B1 | 3/2012 | Huber | |
| 2006/0063046 A1* | 3/2006 | Hu | B60W 10/06 429/414 |
| 2009/0282812 A1* | 11/2009 | Hu | B60K 6/24 60/285 |
| 2010/0100300 A1* | 4/2010 | Brooks | F02B 73/00 701/102 |
| 2012/0145096 A1* | 6/2012 | Shimada | F01N 5/02 123/3 |
| 2014/0369890 A1* | 12/2014 | Hirabayashi | C01B 3/36 422/109 |
| 2019/0084683 A1* | 3/2019 | Schwoller | B64C 11/001 |
| 2019/0186746 A1* | 6/2019 | Lowery | F23R 3/28 |

FOREIGN PATENT DOCUMENTS

EP     0452005     10/1991

* cited by examiner

*Primary Examiner* — Hai H Huynh
*Assistant Examiner* — Gonzalo Laguarda
(74) *Attorney, Agent, or Firm* — Haynes and Boone, LLP

(57) ABSTRACT

An aircraft propulsor that includes an exhaust combustor is disclosed. The aircraft propulsor can include an internal combustion engine and a turbocharger. The turbocharger can be spooled while motoring the internal combustion engine. For example, when restarting the internal combustion engine at high altitude, an injector and an igniter can provide fuel to the exhaust and combust fuel to spool the turbocharger, decreasing load on the engine during restarting. In another example, an electric turbocharger can be driven with an electric motor to spool the turbocharger.

20 Claims, 9 Drawing Sheets

HIGH ALTITUDE INTERNAL COMBUSTION ENGINE/TURBOCHARGER EXHAUST COMBUSTOR

TECHNICAL FIELD

The disclosure relates generally to aircrafts and more specifically to turbocharged internal combustion aircraft propulsors.

BACKGROUND

In certain situations, operation of aircraft at high altitude can require restarting operation of an aircraft propulsor. For example, certain aircraft propulsors can be an internal combustion engine that can include one or more turbochargers powered by energy from the exhaust of the internal combustion engine. As the air at high altitude is thin, the internal combustion engine can fail to provide enough airflow and power to both restart the internal combustion engine and spool the turbocharger.

SUMMARY

Systems and methods are disclosed for an aircraft propulsor that includes an exhaust combustor. In certain examples, an aircraft propulsor is disclosed that includes an internal combustion engine, a turbocharger, an injector, and an igniter. The internal combustion engine can include an intake, a combustion chamber coupled to the intake, and an exhaust coupled to the combustion chamber. The turbocharger can be coupled to the exhaust and configured to be powered by flow within the exhaust. The injector can be coupled to the exhaust, disposed between the combustion chamber and the turbocharger, and configured to deliver fuel to a portion of the exhaust. The igniter can be coupled to the exhaust, disposed between the combustion chamber and the turbocharger, and configured to ignite the fuel delivered by the injector to the portion of the exhaust.

In another example, another aircraft propulsor can be disclosed. The aircraft propulsor can include an internal combustion engine, an electric motor, an electrically-assisted turbocharger, and a controller. The internal combustion engine can include an intake, a combustion chamber coupled to the intake, and an exhaust coupled to the combustion chamber. The electrically-assisted turbocharger can be coupled to the exhaust and the turbocharger can be configured to, alternatively or concurrently, be powered by flow within the exhaust or by the electric motor. The controller can be communicatively coupled to the internal combustion engine and the electrically-assisted turbocharger and be configured to determine that the internal combustion engine is powered down, restart, responsive to determining that the internal combustion engine is powered down, the internal combustion engine, and electrically operate, while restarting the internal combustion engine, the electric motor to spool the electrically-assisted turbocharger.

The scope of the invention is defined by the claims, which are incorporated into this section by reference. A more complete understanding of the disclosure will be afforded to those skilled in the art, as well as a realization of additional advantages thereof, by a consideration of the following detailed description of one or more implementations. Reference will be made to the appended sheets of drawings that will first be described briefly.

BRIEF DESCRIPTION OF THE DRAWINGS

Examples of the disclosure and their advantages are best understood by referring to the detailed description that follows. It should be appreciated that like reference numerals are used to identify like elements illustrated in one or more of the figures.

DETAILED DESCRIPTION

Various examples of aircraft propulsors with exhaust combustors for restarting such aircraft propulsors at high altitude are described herein. Such an aircraft propulsor can include an internal combustion engine with an exhaust and a turbocharger(s) coupled to the exhaust. An injector can be coupled to the exhaust to deliver fuel to a portion of the exhaust. An igniter can also be coupled to the exhaust to ignite fuel delivered by the injector. Thus, when the aircraft propulsor needs to be restarted at altitude, the injector can deliver fuel to the exhaust which is then ignited by the igniter to power the turbocharger. Accordingly, the internal combustion engine would not need to solely provide the power and airflow necessary to restart the turbocharger. Such a configuration would allow for easier restarting of the aircraft propulsor when operating at high altitude.

Figure 1:
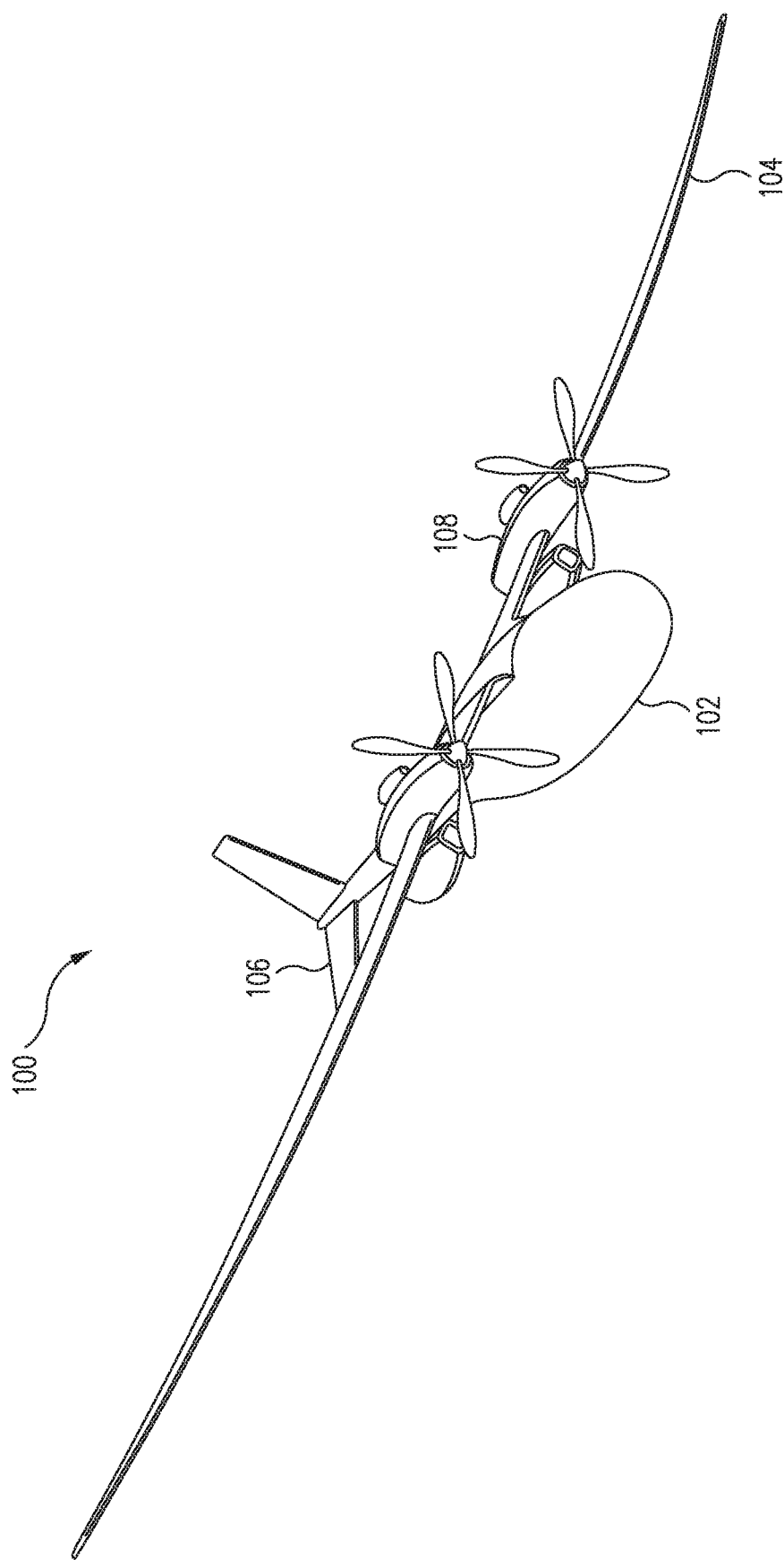
FIG. 1 illustrates an aircraft in accordance with an example of the disclosure.

FIG. 1 illustrates an aircraft in accordance with an example of the disclosure. Aircraft 100 includes fuselage 102, wing 104, tail section 106, and aircraft propulsor 108. Wing 104 and tail section 106 are attached to fuselage 102. Aircraft propulsor 108 can also be attached to fuselage 102, but in other examples, can be attached to one or more of fuselage 102, wing 104, and tail section 106.

While aircraft 100 of FIG. 1 is a fixed wing drone aircraft, in other illustrative examples, aircraft 100 can be some other type of aircraft such as another type of drone or a crew and/or passenger carrying aircraft. For example, aircraft 100 can be another type of fixed wing aircraft, a helicopter or other vertical or short vertical take-off and landing vehicles, a spacecraft, and/or another type of vehicle altogether (e.g., an ekranoplan). In certain examples, such aircraft can be configured to operate at high altitude and can include an aircraft propulsor with one or more turbochargers.

In certain examples, aircraft propulsor 108 can include an internal combustion engine. The internal combustion engine can be, for example, a piston motor, a rotary motor, a jet engine, or another type of internal combustion engine. In certain such examples, the internal combustion engine can utilize gasoline, diesel, hydrogen, natural gas, jet fuel, or another type of fuel source.

Figure 2A:
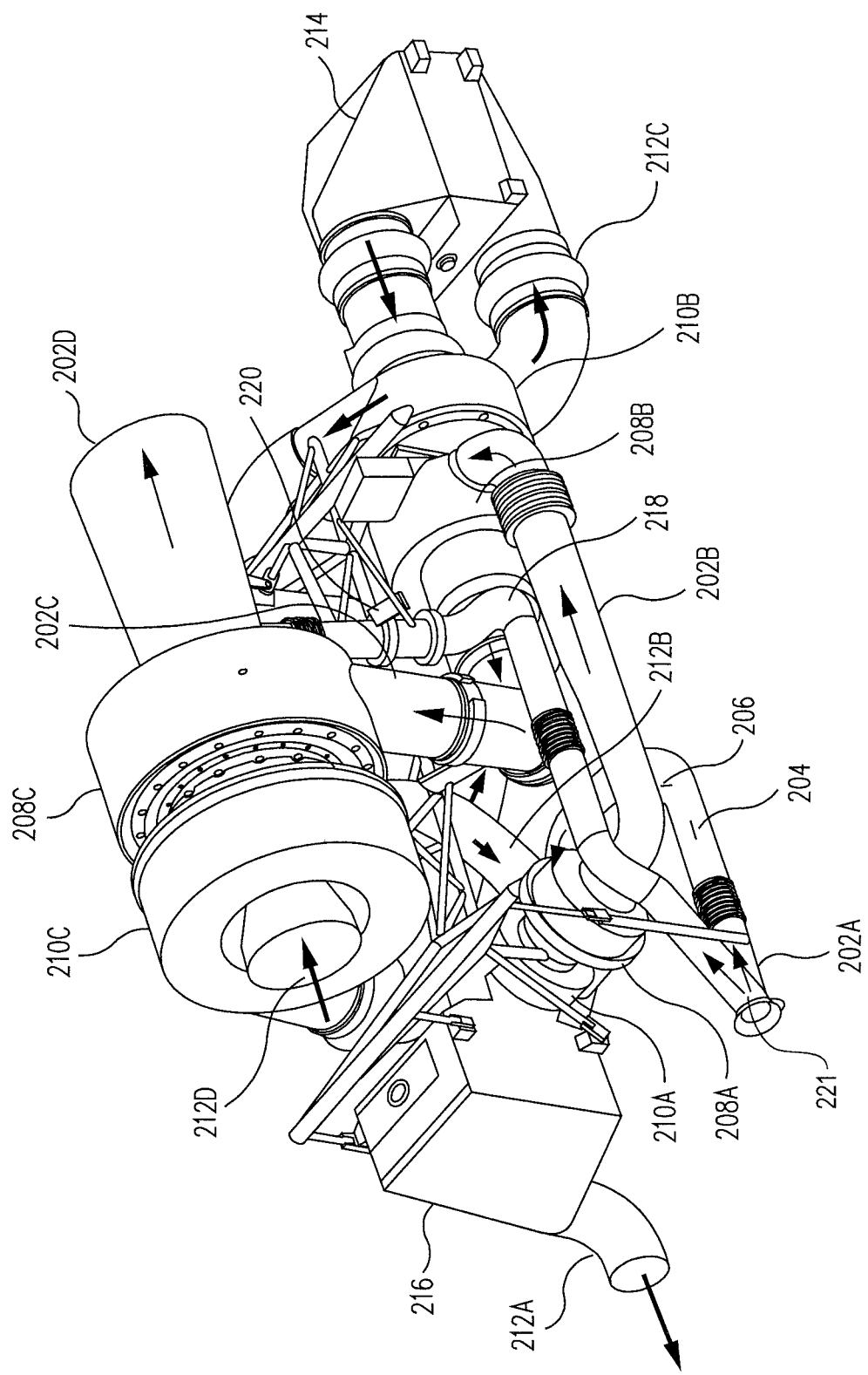
FIGS. 2A and 2B illustrate a turbo-compression system portion of an aircraft propulsor in accordance with an example of the disclosure.
Figure 2B:
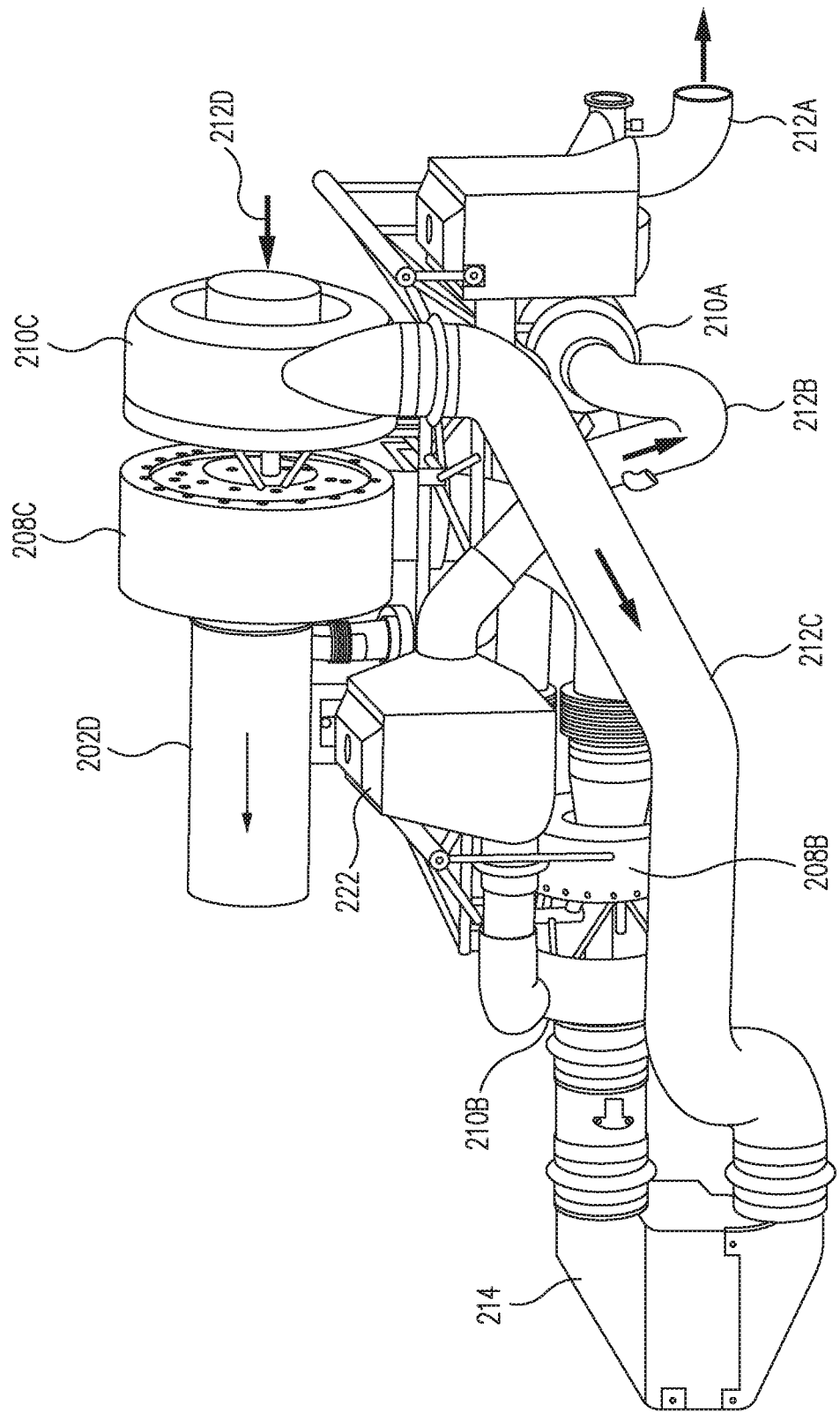

FIGS. 2A and 2B illustrate a turbo-compression system portion of an aircraft propulsor in accordance with an example of the disclosure. FIGS. 2A and 2B illustrates different views of an exhaust and turbocharger portion of an aircraft propulsor with exhaust first portion 202A exhaust second portion 202B, exhaust third portion 202C, exhaust fourth portion 202D, and exhaust bypass 218.

Exhaust first portion 202A receives exhaust from an internal combustion engine. In certain examples, the internal combustion engine can operate at an air-fuel ratio less than stoichiometric (e.g., at an air-fuel ratio where there is still oxygen remaining after combustion). For example, the internal combustion engine can be powered by hydrogen and run at less than stoichiometric (e.g., at approximately 20%, 40%, 60%, or 80% of stoichiometric). Accordingly, oxygen can still be present in the exhaust after the combustion stage of an internal combustion engine that uses hydrogen as fuel. In other examples, the internal combustion engine can be operated to pump air, but not combust fuel.

First turbocharger 208A is disposed between exhaust first portion 202A and exhaust second portion 202B. Under certain circumstances, such as operating at high altitude, the aircraft propulsor will need to be restarted. In certain such circumstances the air at high altitude is thin. Restarting the internal combustion engine will result in the internal combustion engine initially operating at low engine speeds. At such low engine speeds, the internal combustion engine can lack enough airflow and power to spool the turbocharger. Additionally, the one or more unspooled turbochargers can impose an additional restriction within the exhaust and prevent the internal combustion engine from timely increasing in engine speed. Thus, an alternative technique is required to spool the turbocharger when restarting at high altitude.

As such, injector 204 can deliver fuel to exhaust first portion 202A to be ignited by igniter 206. The delivered fuel can mix with oxygen present within the exhaust. Igniter 206 can then ignite the air-fuel mixture to power first turbocharger 208A by, for example, driving airflow within the exhaust.

Injector 204 and igniter 206 are disposed within exhaust first portion 202A before first turbocharger 208A. In certain examples, the internal combustion engine can operate and combust an air-fuel mixture. Such internal combustion engines can be run at less than stoichiometric air-fuel ratios. Thus, the resulting exhaust from the internal combustion engine can be bereft of fuel, but can still have oxygen present. Accordingly, injector 204 can be configured to only inject fuel in such examples. The fuel can mix with the leftover oxygen present in the exhaust. In other examples, injector 204 can deliver pre-mixed fuel and oxygen while yet other examples can include a plurality of injectors, one of the injectors configured to deliver fuel and another injector configured to deliver oxygen.

Igniter 206 can be, for example, a spark plug or other system configured to ignite fuel delivered by injector 204. Igniter 206 can be configured to provide a timely spark to the air-fuel mixture for ignition.

In certain such examples, a plurality of turbochargers, such as turbochargers 208A, 208B, and 208C, can be coupled to the exhaust. Thus, as shown in FIGS. 2A and 2B, second turbocharger 208B is disposed between exhaust second portion 202B and exhaust third portion 202C and third turbocharger 208C is disposed between exhaust third portion 202C and exhaust fourth portion 202D. Such turbochargers 208A, 208B, and 208C can be powered by airflow within the exhaust. Exhaust that powers turbochargers 208A, 208B, and 208C can then exit through exhaust fourth portion 202D. Exhaust airflow is shown by the narrow arrows of FIGS. 2A and 2B.

Each of turbochargers 208A, 208B, and 208C can be configured to, when spooled, compress air delivered to the internal combustion engine. As illustrated in FIG. 2, turbochargers 208A, 208B, and 208C include compressors 210A, 210B, and 210C, respectively. Compressors 210A, 210B, and 210C can, when turbochargers 208A, 208B, and 208C are respectively spooled, compress air before the air is delivered to a combustion chamber 403 (FIG. 4) of the internal combustion engine. Such compressed air can allow for greater amounts of air to be delivered to the combustion chamber of the internal combustion engine. Greater amounts of fuel can then be accordingly delivered and, thus, the internal combustion engine can then generate greater power.

In such an example, first turbocharger 208A can be the turbocharger with the greatest effect (e.g., can provide the greatest restriction) on restarting of the internal combustion engine. Accordingly, injector 204 and igniter 206 can be disposed within exhaust first portion 202A to primarily power first turbocharger 208A. Other examples can dispose one or more injectors and/or igniters within exhaust second portion 202B, exhaust third portion 202C, and/or exhaust fourth portion 202D to power one or more other turbochargers (e.g., second turbocharger 208B and/or third turbocharger 208C).

Thus, for example, intake air can flow through intake portions 212A-D. Intake airflow is shown by the bolded arrows of FIGS. 2A and 2B. Intake portions 212A and 212B can be coupled to either side of the inlet and exit of compressor 210A. Intake portions 212B and 212C can be coupled to either side of the inlet and exit of compressor 210B. Intake portions 212C and 212D can be coupled to either side of the inlet and exit of compressor 210C.

Air can enter intake portion 212D and travel through intake portions 212C, 212B, and 212A. Compressors 210A, 210B, and 210C can compress the air traveling through the intake portions. The compressed air can then exit the intake portions through intake portion 212A and flow into a combustion chamber of the internal combustion engine.

Compressing the air by compressors 210A, 210B, and 210C can heat up the air. In certain examples, intake portions 212A, 212B, and/or 212C can be coupled to one or more intercoolers, such as intercoolers 214, 216, and 222. Intercoolers 214, 216, and 222, as well as other intercoolers, can cool the compressed air and allow for greater air density.

The exhaust can also include a Y-joint 221 that allows for air to flow through exhaust bypass 218 instead of into exhaust first portion 202A. Airflow through exhaust bypass 218 can be controlled by valve 220. Valve 220 can regulate the amount of airflow through exhaust bypass 218 and, thus, control the air pressure within the exhaust portions 202A, 202B, and/or 202C. Thus, valve 220 can regulate the amount of boost generated by turbochargers 208A, 208B, and/or 208C. If turbochargers 208A, 208B, and/or 208C are determined to be generating too much boost (e.g., through one or more pressure sensors within the exhaust portions), valve 220 can allow for more airflow through exhaust bypass 218 and, thus, decrease the amount of boost generated. Conversely, valve 220 can decrease or stop airflow through exhaust bypass 218 to allow for turbochargers 208A, 208B, and/or 208C to generate a greater amount of boost.

Certain other examples can include alternative arrangements of the turbochargers, exhausts, or other components. For example, the exhaust can include a Y-joint separating the exhaust into a first section and a second section. A first turbocharger can be coupled to the first section and a second turbocharger can be coupled to the second section. In such a configuration, airflow can diverge into the first section or the second section to power either the first turbocharger or the second turbocharger. In certain such examples, an injector and/or an igniter can be disposed in one or both of the first section or the second section or be disposed before the Y to spool both the first and second turbochargers.

Figure 3:
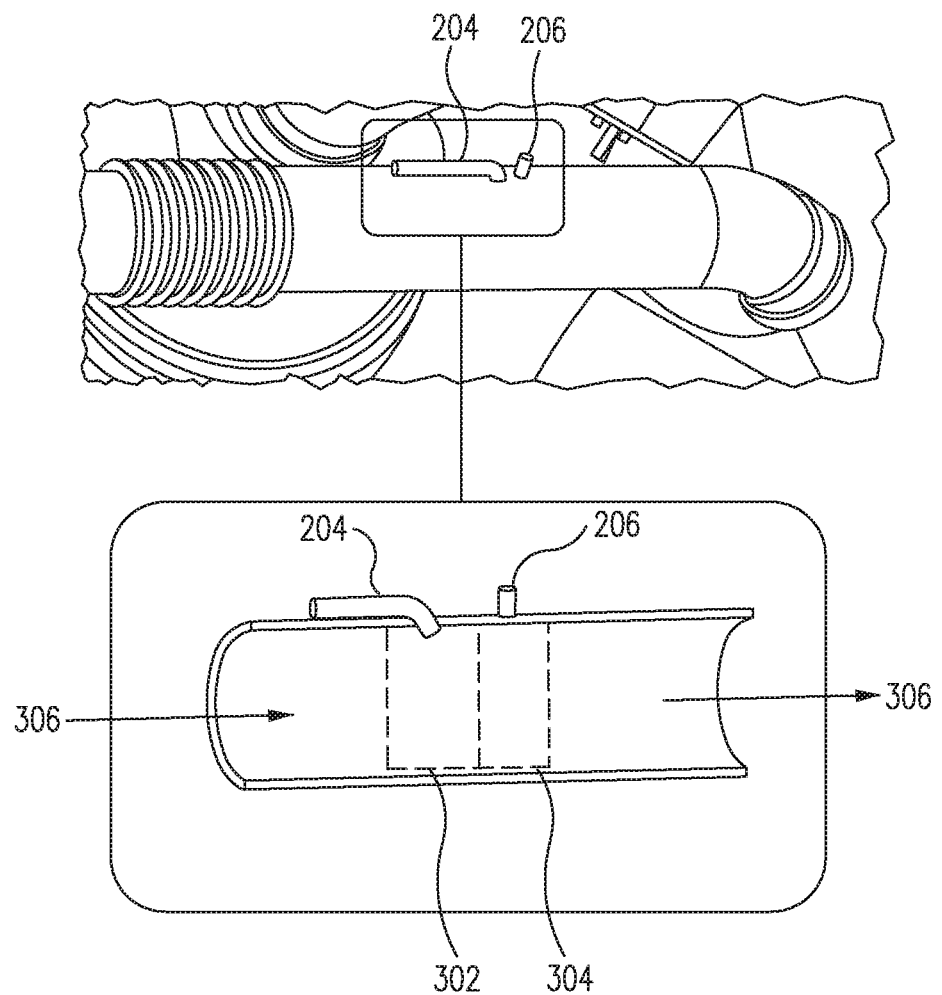
FIG. 3 illustrates a side view and a side cutaway of an exhaust combustor of an aircraft propulsor in accordance with an example of the disclosure.

FIG. 3 illustrates a side view and a side cutaway of an exhaust combustor of an aircraft propulsor in accordance with an example of the disclosure. FIG. 3 illustrates injector 204 and igniter 206 disposed within a portion of the exhaust. FIG. 3 also illustrates a cutaway view of the portion of the exhaust.

The cutaway view shows portions 302 and 304 of the exhaust. Injector 204 is configured to deliver fuel to portion 302. Air can flow through the exhaust through flow path 306. Fuel delivered by injector 204 can accordingly mix with the air flowing through the exhaust.

As the air-fuel mixture flows, the mixture reaches portion 304. Igniter 206 can be configured to ignite air-fuel mixture within portion 304 by, for example, producing a spark, electrical charge, or otherwise imparting energy to the air-fuel mixture to initiate combustion. Combustion of the air-fuel mixture can then power turbochargers disposed downstream of portions 302 and 304.

Figure 4:
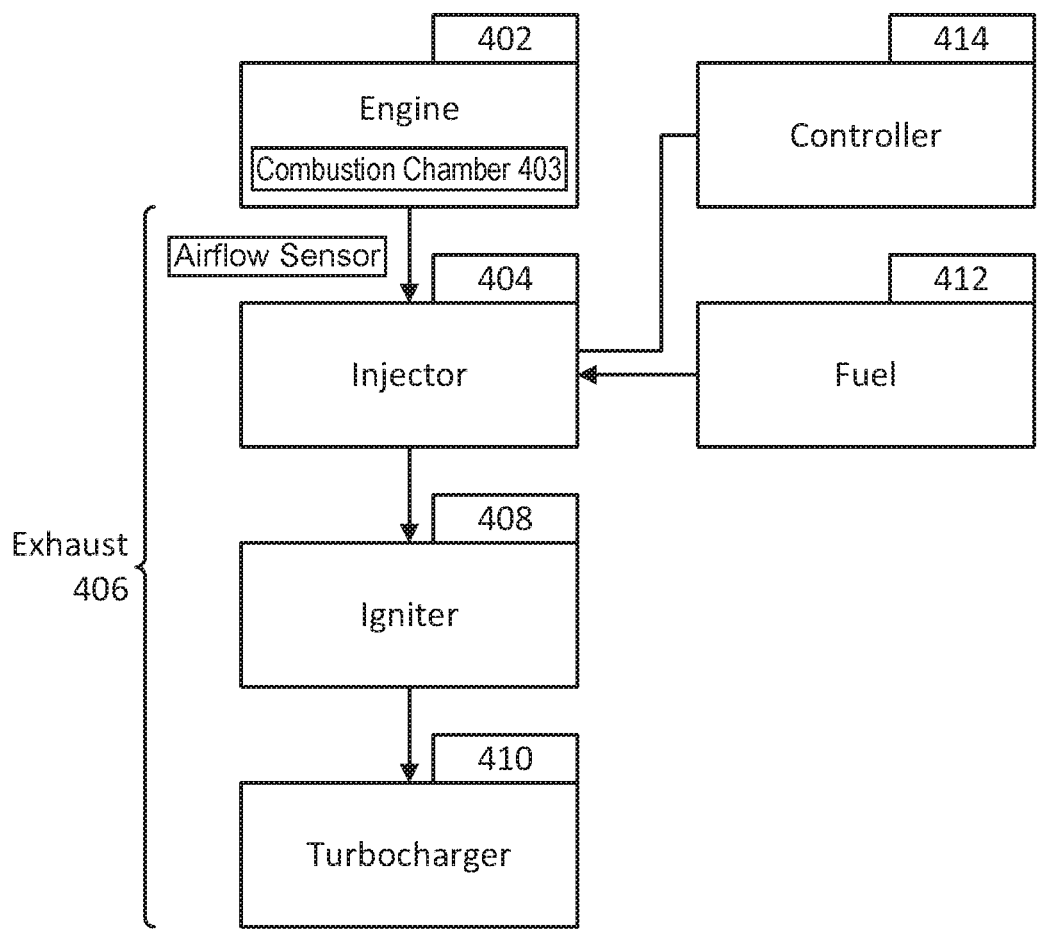
FIG. 4 is a block diagram detailing a configuration of an aircraft propulsor with an exhaust combustor in accordance with an example of the disclosure.

FIG. 4 is a block diagram detailing a configuration of an aircraft propulsor with an exhaust combustor in accordance with an example of the disclosure. FIG. 4 illustrates an aircraft propulsor with engine 402, injector 404, igniter 408, turbocharger 410, fuel source 412, and controller 414. Injector 404, igniter 408, and turbocharger 410 can be disposed within portions of exhaust 406.

Engine 402 can be an internal combustion engine as described herein. Exhaust 406 can receive combustion byproducts from engine 402, which can include leftover oxygen. Fuel source 412 can provide fuel to injector 404. Injector 404 then delivers the fuel to a portion of exhaust 406. The resulting air-fuel mixture is then ignited by igniter 408 for combustion. Combustion of the air-fuel mixture can be used to power or spool turbocharger 410.

Controller 414 can control the timing of igniter 408 and, thus, control when igniter 408 ignites the air-fuel mixture after the injector 404 has provided fuel. In certain such examples, controller 414 can control the timing of igniter 408 in response to, for example, the velocity of the airflow within the exhaust. Accordingly, the exhaust can include one or more sensors to detect the speed of airflow within the exhaust. Controller 414 can then adjust the timing of igniter 408 in response to the detected airflow velocity to, for example, provide a spark at one or more periods for optimal combustion.

Figure 5:
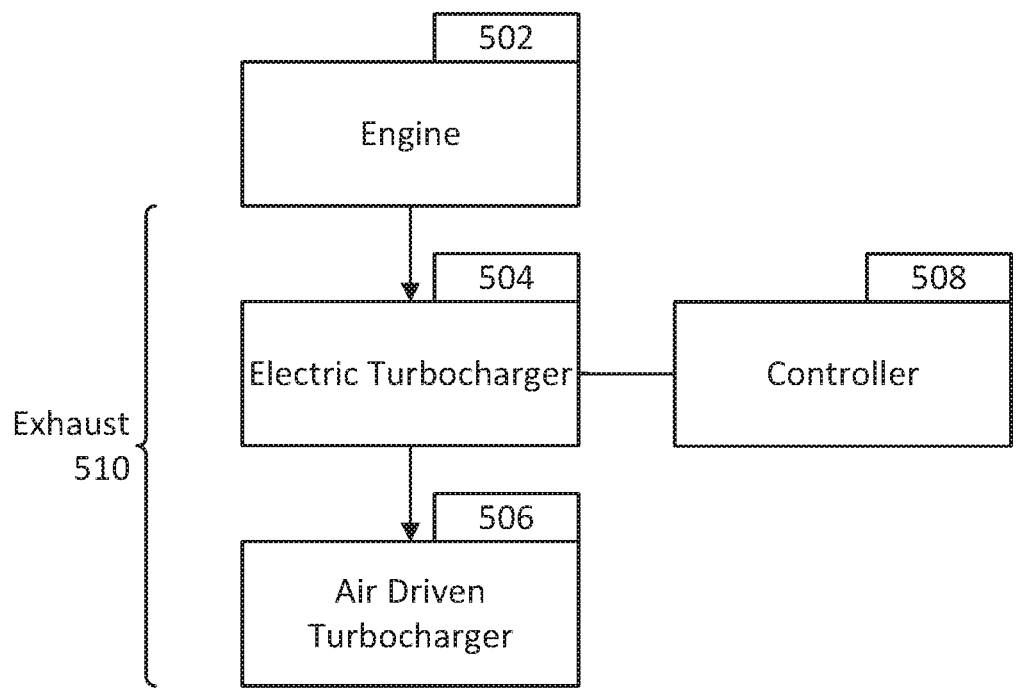
FIG. 5 is a block diagram detailing another configuration of an aircraft propulsor with exhaust driven and electric turbochargers in accordance with an example of the disclosure

FIG. 5 is a block diagram detailing another configuration of an aircraft propulsor with exhaust driven and electric turbochargers in accordance with an example of the disclosure. FIG. 5 illustrates an aircraft propulsor with engine 502, electric turbocharger 504, air driven turbocharger 506, and controller 508. Electric turbocharger 504 and air driven turbocharger 506 can be disposed within portions of exhaust 510. Electric turbocharger 504 and air driven turbocharger 506 can include compressors configured to compress intake air. The electric turbocharger can include an electric motor coupled to the compressor.

Engine 502 can be an internal combustion engine as described herein. Also as described herein, exhaust 510 can receive combustion byproducts from engine 502. Electric turbocharger 504 can be coupled to a battery or aircraft electrical system powered by another propulsor. Electric turbocharger 504 can be configured to be driven under electric power through electricity received from the battery (e.g., to compress intake air) or, in other situations, can be driven by airflow within the exhaust to compress intake air and/or generate electricity (e.g., the electric turbocharger can function as a generator).

In certain such situations, boost generated by the electric turbocharger 504 can be controlled through electricity generation. Thus, for example, if controller 508 determines that electric turbocharger 504 is generating an amount of boost greater than a boost threshold, controller 508 can cause the electric turbocharger 504 to generate electricity instead. Generation of electricity can decrease the amount of boost generated by electric turbocharger 504 (e.g., to below the boost threshold).

In examples where engine 502 needs to be restarted at altitude, electric turbocharger 504 can be electrically driven to provide more airflow to engine 502. Thus, electric turbocharger 504 can be at least partially driven by electric power to increase the airflow to the engine 502, which will also increase the airflow thru the turbines. When engine 502 is restarted and can provide enough exhaust airflow to power electric turbocharger 504, electric turbocharger 504 can be switched to be spooled, fully or partially, by the exhaust airflow. Electric turbocharger 504 can generate electricity and/or boost. Controller 508 can control operation of electric turbocharger 504.

Certain examples can additionally include one or more air driven turbochargers downstream of electric turbocharger 504. For example, air driven turbocharger 506 can be powered by exhaust airflow. In certain examples, air driven turbocharger 506 can be configured to spool after electric turbocharger 504. Such configurations can include one electric turbocharger or a plurality of electric turbochargers and/or one or a plurality of air driven turbochargers.

Figure 6:
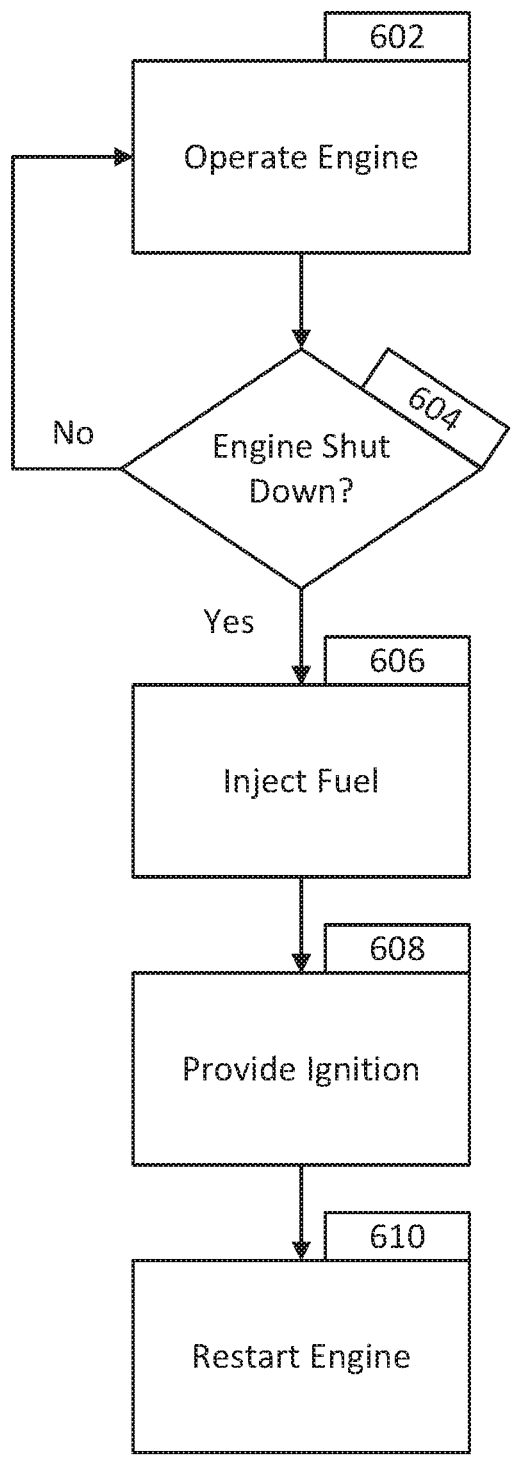
FIG. 6 is a block diagram detailing operation of an aircraft propulsor with an exhaust combustor in accordance with an example of the disclosure.

FIG. 6 is a block diagram detailing operation of an aircraft propulsor with an exhaust combustor in accordance with an example of the disclosure. One, some, or all of the operations detailed in FIGS. 6 and 7 can be controlled by one or more controllers. The process of FIG. 6 can be used to operate aircraft propulsors described in FIGS. 2-4.

In block 602, an internal combustion engine is operated. The internal combustion engine can include an exhaust that includes one or more turbochargers as well as one or more injectors and igniters disposed within the exhaust. The internal combustion engine can be operated to power an aircraft.

In block 604, a determination is made as to whether the internal combustion engine has shut down and needs restart. For example, one or more sensors (e.g., sensors to determining the engine speed of the internal combustion engine, or exhaust temperatures) can be used to determine if the internal combustion engine is operating or not. If the internal combustion engine is determined to still be operating, the process can return to block 602 and operate the engine. If the internal combustion engine is determined to have shut down (e.g., in response to a control input or through stalling), then the process can continue to block 606. When the internal combustion engine is shut down, one or more turbochargers of the aircraft propulsor can also not be spooled and thus not generate boost.

In block 606, fuel is injected into a portion of the exhaust by an injector. The portion of the exhaust can be upstream of one or more turbochargers and, thus, the fuel can be injected upstream of the one or more turbochargers while electrically motoring or windmilling the engine. The fuel can then mix with oxygen within the exhaust (e.g., the internal combustion engine can be in the process of restarting at the same time and can, accordingly, pump air into the exhaust). In certain examples, oxygen can remain within the exhaust due to lack of combustion within the internal combustion engine, due to incomplete combustion, and/or due to the internal combustion engine operating leaner than stoichiometric air-fuel ratios.

In block 608, one or more igniters can ignite the fuel delivered by the injector by, for example, providing a spark or otherwise providing energy to start combustion of the air-fuel mixture. Combustion of the air-fuel mixture can then spool the turbocharger. During or after the turbocharger has been spooled, the engine can be motored and/or windmilled. For example, the engine can be motored and/or windmilled during any period when blocks 606, 608, and/or 610 are performed. In certain examples, a spooled turbocharger can provide sufficient intake pressure to enable restarting the engine.

In block 610, the engine is restarted (e.g., through a starter coupled to the engine) and the turbocharger is spooled from combustion of the air fuel mixture by the igniter. In certain examples, the injector and igniter can continue operating until the engine is operating at a power level that can provide and sustain a volume of exhaust airflow necessary to spool the turbocharger.

Figure 7:
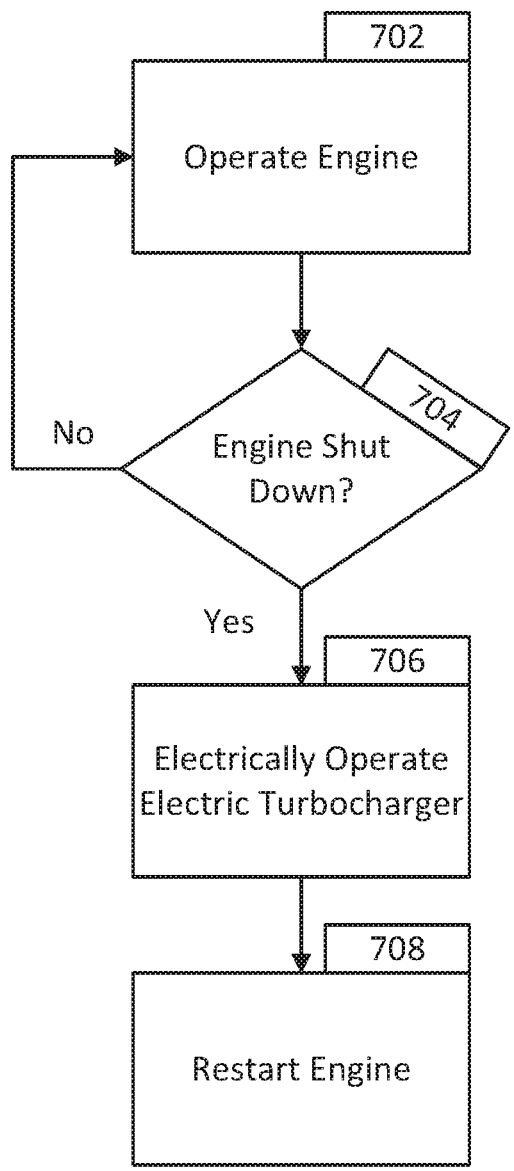
FIG. 7 is a block diagram detailing operation of an aircraft propulsor with an exhaust electric turbocharger in accordance with an example of the disclosure.

FIG. 7 is a block diagram detailing operation of an aircraft propulsor with an exhaust electric turbocharger in accordance with an example of the disclosure. The process of FIG. 7 can be used to operate the aircraft propulsor described in FIG. 5.

In block 702, an internal combustion engine is operated, similar to block 602. In block 704, similar to block 604, a determination is made as to whether the internal combustion engine has stopped operating. If the engine is determined to be operating, the process returns to block 702, but if the engine is determined to not be operating, the process proceeds to block 706.

In block 706, an electric turbocharger can be electrically operated (e.g., spooled electrically). Electrically spooling the turbocharger increases the airflow to the engine at increased pressures. During or after the electric turbocharger has been operated, the engine can be motored. For example, the engine can be motored while the technique of block 706 is performed. In certain examples, the electric turbocharger can provide sufficient intake pressure to enable restarting the engine.

In block 708, the engine is restarted. Once the engine is operating at a power level that can provide and sustain a volume of exhaust airflow necessary to spool the electric turbocharger, the electric turbocharger can stop operating on electric power and be spooled by exhaust airflow.

Figure 8:
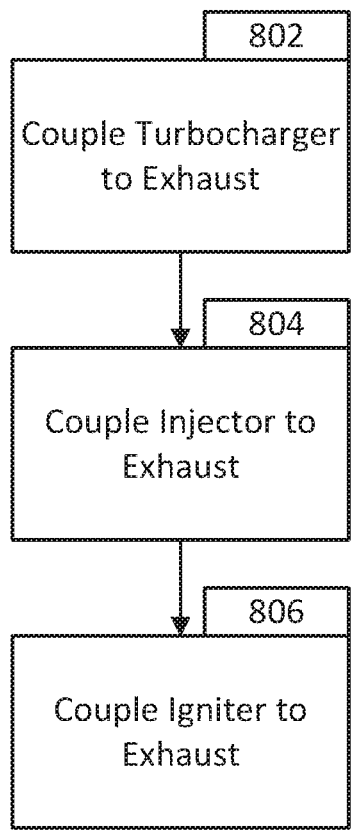
FIG. 8 is a block diagram detailing assembly of an aircraft propulsor with an exhaust combustor in accordance with an example of the disclosure.

FIG. 8 is a block diagram detailing assembly of an aircraft propulsor with an exhaust combustor in accordance with an example of the disclosure. In block 802, an internal combustion engine with an exhaust is provided and a turbocharger is coupled to the exhaust. In certain examples, the exhaust can be divided into a plurality of portions and a plurality of turbochargers can be coupled to the portions of the exhaust.

In block 804, an injector can be coupled to the exhaust. In block 806, an igniter can be coupled to the exhaust. In certain examples, the exhaust can include one or more openings for the injector and/or the igniter. The injector and/or the igniter can be inserted into the one or more openings.

Also, in block 804, a fuel source can be coupled to the injector. The fuel source can provide the fuel that the injector provides to the exhaust. Additionally, in block 806, a power source can also be coupled to the igniter. The igniter can use the power from the power source to ignite an air-fuel mixture within the exhaust to spool the turbocharger.

In certain examples, a plurality of injectors and/or igniters can be disposed within the exhaust (e.g., one or more sets of injectors and/or igniters can be provided for each turbocharger). The plurality of injectors and/or igniters can be provided and coupled as described herein.

Examples described above illustrate but do not limit the invention. It should also be understood that numerous modifications and variations are possible in accordance with the principles of the present invention. Accordingly, the scope of the invention is defined only by the following claims.

What is claimed is:

1. An aircraft propulsor comprising:
   an internal combustion engine comprising an intake, a combustion chamber coupled to the intake, and an exhaust coupled to the combustion chamber;
   a turbocharger coupled to the exhaust and configured to be powered by flow within the exhaust;
   an injector coupled to the exhaust, disposed between the combustion chamber and the turbocharger, and configured to deliver fuel to a portion of the exhaust;
   an igniter coupled to the exhaust, disposed between the combustion chamber and the turbocharger, and configured to ignite the fuel delivered by the injector to the portion of the exhaust;
   an airflow velocity sensor disposed within the exhaust configured to measure the airflow velocity in the exhaust; and
   a controller communicatively coupled to the internal combustion engine, the injector, and the igniter, configured to determine a timing of the igniter in response to the measured airflow velocity such that the igniter ignites the fuel at an optimal combustion moment.

2. The aircraft propulsor of claim 1, wherein the turbocharger is a first turbocharger and further comprising a second turbocharger disposed downstream of the injector and the igniter and configured to be powered by flow within the exhaust.

3. The aircraft propulsor of claim 2, further comprising a third turbocharger configured to be powered by flow within the exhaust.

4. The aircraft propulsor of claim 2, wherein the exhaust comprises a first section and a second section downstream of the first section, wherein the first turbocharger is coupled to the first section, and wherein the second turbocharger is coupled to the second section.

5. The aircraft propulsor of claim 2, comprises a Y-joint separating the exhaust into a first section and a second section, wherein the first turbocharger is coupled to the first section, and wherein the second turbocharger is coupled to the second section.

6. The aircraft propulsor of claim 1, further comprising a controller communicatively coupled to the internal combustion engine, the injector, and the igniter, wherein the controller is configured to:
   determine that the internal combustion engine is powered down;

provide, after determining that the internal combustion engine is powered down, instructions for the injector to deliver the fuel to the portion of the exhaust; and provide, after the injector has delivered the fuel, instructions for the igniter to ignite the fuel.

7. The aircraft propulsor of claim 1, wherein the fuel comprises hydrogen.

8. The aircraft propulsor of claim 1, wherein the internal combustion engine is provided with an air-fuel mixture of less than stoichiometric.

9. The aircraft propulsor of claim 1, further comprising:
a bypass flow path coupled to the exhaust and disposed upstream of the turbocharger; and
a valve disposed within the bypass flow path and configured to control flow within the bypass flow path.

10. An aircraft comprising the aircraft propulsor of claim 1, the aircraft comprising:
a fuselage; and
a wing, wherein the aircraft propulsor is coupled to the fuselage and/or the wing.

11. A method of operating the aircraft propulsor of claim 1, the method comprising:
determining that the internal combustion engine is powered down;
flowing, responsive to the determining that the internal combustion engine is powered down, air through the internal combustion engine to the exhaust;
delivering, with the injector, the fuel to the portion of the exhaust to create a mixture with the fuel and the air;
igniting the mixture with the igniter; and
spooling, responsive to the igniting the mixture, the turbocharger.

12. A method of manufacturing the aircraft propulsor of claim 1, the method comprising:
coupling the turbocharger to the exhaust;
coupling the injector to the portion of the exhaust; and
coupling the igniter to the exhaust.

13. An aircraft propulsor comprising:
an internal combustion engine comprising an intake, a combustion chamber coupled to the intake, and an exhaust coupled to the combustion chamber;
an electric motor;
an electrically-assisted turbocharger coupled to the exhaust and the electric motor, wherein the electrically-assisted turbocharger is configured to, alternatively or concurrently, be powered by flow within the exhaust or by the electric motor;
an airflow velocity sensor disposed within the exhaust configured to measure the airflow velocity in the exhaust; and
a controller communicatively coupled to the internal combustion engine and the electrically-assisted turbocharger, wherein the controller is configured to:
determine that the internal combustion engine is powered down;
restart, responsive to determining that the internal combustion engine is powered down, the internal combustion engine; and
determine a timing of the electrically-assisted turbocharger in response to the measured airflow velocity to electrically operate, while restarting the internal combustion engine, the electric motor to spool the electrically-assisted turbocharger.

14. The aircraft propulsor of claim 13, wherein spooling the electrically-assisted turbocharger comprises rotating a compressor of the turbocharger.

15. The aircraft propulsor of claim 13, wherein the controller is further configured to:
determine that the internal combustion engine is operating;
determine that a boost threshold for the turbocharger is exceeded; and
limit, responsive to determining that the boost threshold for the turbocharger is exceeded, boost generated by the turbocharger to below the boost threshold by generating electrical power with the turbocharger.

16. The aircraft propulsor of claim 13, wherein the electrically-assisted turbocharger is a first turbocharger, and wherein the aircraft propulsor further comprises a second turbocharger coupled to the exhaust and disposed downstream of the first turbocharger.

17. The aircraft propulsor of claim 16, wherein the second turbocharger is configured to be powered by flow within the exhaust independent of the electric motor.

18. The aircraft propulsor of claim 17, wherein the controller is further configured to:
determine that a boost threshold for the second turbocharger is exceeded; and
limit, responsive to determining that the boost threshold for the second turbocharger is exceeded, boost generated by the second turbocharger to below the boost threshold by generating electrical power with the first turbocharger.

19. An aircraft comprising the aircraft propulsor of claim 13, the aircraft comprising:
a fuselage; and
a wing, wherein the aircraft propulsor is coupled to the fuselage and/or the wing.

20. A method of manufacturing the aircraft propulsor of claim 13, the method comprising:
coupling the electric motor to the electrically-assisted turbocharger; and
coupling the electrically-assisted turbocharger to the exhaust.

* * * * *